United States Patent [19]
Kudo et al.

[11] Patent Number: 5,148,429
[45] Date of Patent: Sep. 15, 1992

[54] VOICE DATA TRANSMISSION SYSTEM AND METHOD

[75] Inventors: Norimasa Kudo, Kawasaki; Akira Watanabe, Hachioji, both of Japan

[73] Assignee: Kabushiki Kaisha Toshiba, Kawasaki, Japan

[21] Appl. No.: 426,379

[22] Filed: Oct. 25, 1989

[30] Foreign Application Priority Data

Oct. 27, 1988 [JP] Japan .................................. 63-271602
Jan. 24, 1989 [JP] Japan ..................................... 1-14900

[51] Int. Cl.$^5$ ................................................ H04J 3/24
[52] U.S. Cl. ........................................ 370/9.42; 370/60
[58] Field of Search ...................... 370/80, 81, 60.1, 91, 370/31, 94.2; 381/46, 110

[56] References Cited

U.S. PATENT DOCUMENTS

| | | | |
|---|---|---|---|
| 4,110,560 | 8/1978 | Leary et al. | 370/31 |
| 4,627,091 | 12/1986 | Fedele | 381/46 |
| 4,736,370 | 4/1988 | Hirome et al. | 370/94.2 |
| 4,771,472 | 9/1988 | Williams, III et al. | 381/110 |
| 4,945,566 | 7/1990 | Mergel et al. | 381/46 |

Primary Examiner—Douglas W. Olms
Assistant Examiner—Shick Hom
Attorney, Agent, or Firm—Finnegan, Henderson, Farabow, Garrett and Dunner

[57] ABSTRACT

A voice data transmission system and method which can reduce transmission delay time and can remove unnatural conversation in a received voice signal due to the truncation of a head part of the voice signal. The signal transmission side of the voice data transmission system, when a voice detection signal is generated, continuously transmits, at a transmission rate faster than a usual transmission rate, a first voice data block at the time of generation of the voice detection signal as well as voice data blocks which are followed by the first voice data block and which correspond to a time duration from the generation time of the voice detection signal block to a predetermined time. In a voice detection mode, the data transmission side subjects voice data to a block formation operation and, after the block formation is completed, transmits the voice data block. The signal reception side of the data transmission system, when receiving a voice packet signal followed by the continuation of a predetermined time of silence, estimates a fluctuation absorbing delay time for the voice packet signal on the basis of transmission delay times between packets corresponding to its head part, and attaches packets corresponding in number to the estimated fluctuation absorbing delay time to the head part of the received voice packet signal.

14 Claims, 9 Drawing Sheets

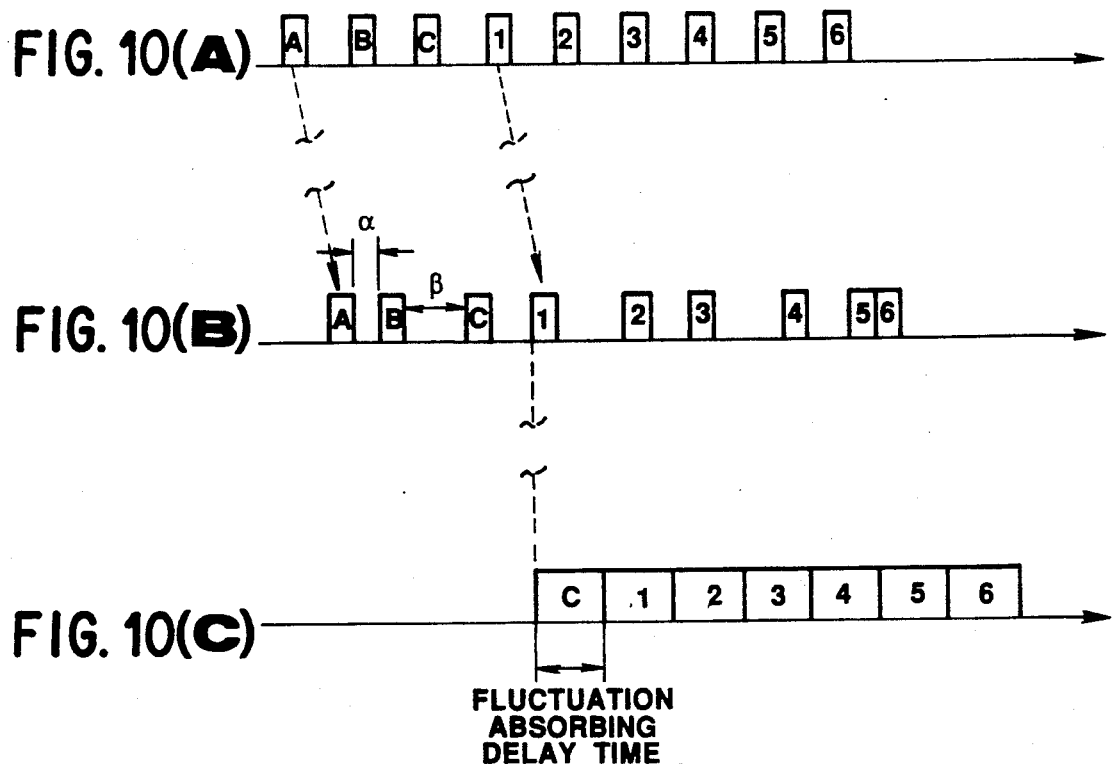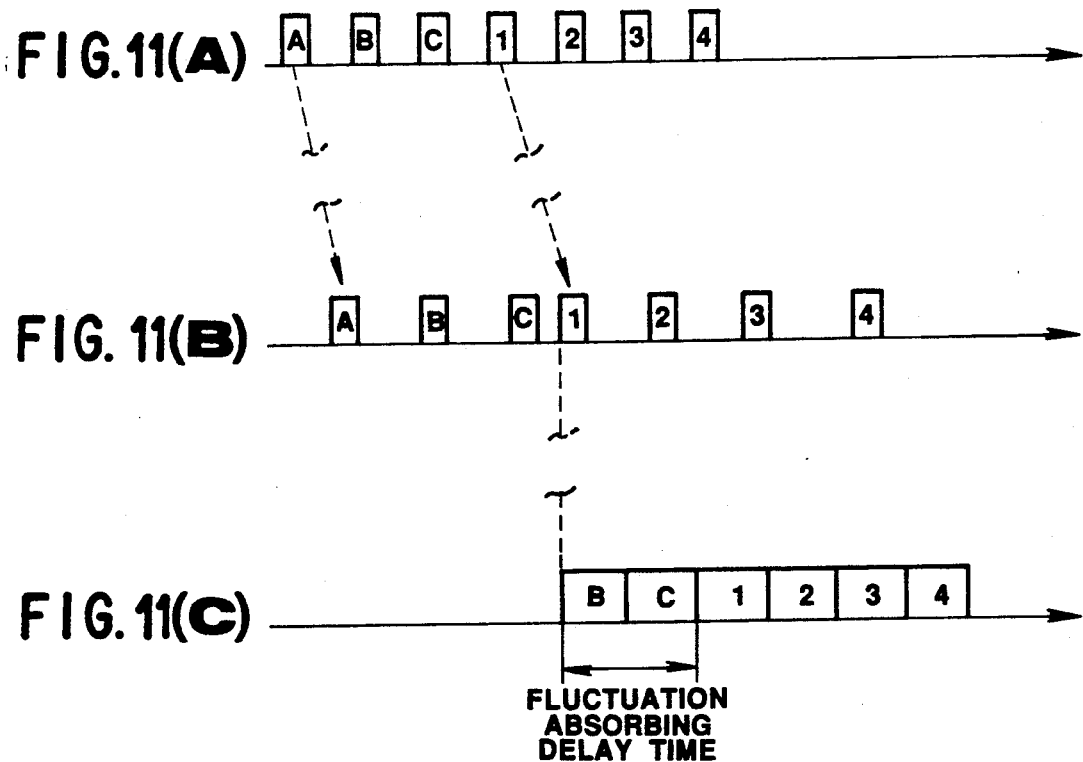

VOICE DATA TRANSMISSION SYSTEM AND METHOD

BACKGROUND OF THE INVENTION

1. Field of the Invention

The present invention relates to voice data transmission systems and methods in which voice data is converted into a packet and then transmitted in packet form, and more particularly, to the voice data transmission system and method which can minimize a transmission delay time to thereby remove an unnatural reception voice as a head-part truncated voice.

2. Description of the Related Art

FIG. 1 shows, in network form, an example of systems of the type referred to wherein voice data is converted into a packet or packets and then transmitted on a packet basis. In the drawing, the illustrated network includes multiplex lines 1, packet exchanges 2A to 2C, packet terminals 3A to 3C, exchanges 4A to 4C, and telephone sets 5A to 5C.

FIG. 2 shows in block diagram form the interior arrangement of one of the packet exchanges 2A to 2C. This arrangement includes terminal interfaces TINF, respectively connected with the associated packet terminals, a line interface LINF which forms an interface with the multiplex line 1, a controller CONT, a bus, access controller ARB, an interrupt control bus, BUS1, a control bus, BUS2, an access control bus, BUS3, and a data bus, BUS4. Each of the terminal interfaces TINF, when receiving a calling packet from one of the packet terminals, sends an interrupt command to the controller CONT through the interrupt control bus BUS1. The controller CONT, when confirming the interrupt command, gets access to a memory (not shown) provided within the terminal interface TINF in question through the control bus BUS2 and confirms the calling data, such as the caller number, and the window size. Thereafter, the controller CONT outputs to the access control bus BUS 3 an access request to the data bus BUS4 to transmit a connection request packet to the party packet terminal which forms an opposing node. The controller CONT, when acquiring data bus access authority, then sends a connection request to the line interface LINF through the data bus BUS4. The line interface LINF, when receiving the connection request, prepares a connection request packet having the same format as a data packet and then transmits it to the multiplex line 1. The line interface LINF, when receiving a connection approval or disapproval packet from the opposing node, from the party packet terminal, sends the received packet to the controller CONT. When the controller CONT receives the connection approval packet through the control bus BUS2, the controller prepares a connection table in a memory (not shown) provided in the line interface LINF and the related terminal interface TINF, and then sends the connection approval packet to the associated terminal interface TINF. The terminal interace TINF, when receiving the connection approval packet, transmits it to the corresponding packet terminal and is thereafter put in its data transmission phase. In the data transmission phase, the terminal interface TINF sends a data packet to the line interface LINF through the data bus BUS4, in which case such a header H as shown in FIG. 3 is attached to a data D with use of the connection table prepared by the controller CONT. A combination of the header H and the data D is sent thereto as the data packet. The line inteface LINF, when receiving the data packet, stores it in a buffer provided therein and then transmits it to the multiplex line 1. In the operation of the line interface LINF, a data packet in its data transmission phase is repeated as in the terminal interface TINF. In the case of a disconnection, the receipt of a connection disapproval packet, the same operation as in the connection request is carried out except that the connection table is deleted.

FIG. 4 is a block diagram showing a prior art arrangement of a voice terminal interface which converts a voice signal into one packet or a plurality of packets. In FIG. 4, a signal data processing part is omitted for abbreviation of explanation. The voice terminal interface of FIG. 4 includes an analog interface 6A, an encoder 7 for encoding an input signal, for example, on a PCM coding basis or on a high-efficiency compression coding basis, basis. The voice terminal interface also includes a memory 8 for storing one or more blocks of codes, a voice presence/silence detector 9, a packet assembler 10 for converting codes received from the memory 8 into packets as the data part D shown in FIG. 3 and then for sending the packet to the data bus BUS4. The controller 11 performs bus access control and informs the packet assembler 10 of such data as a time stamp (not shown) in the header H, and a memory pointer controller 20.

Explanation will next be made of the signal reception section of the voice terminal interface of FIG. 4. The memory 14 functions as a fluctuation absorbing delay buffer for compensating for differences in transmission delay between signals transmitted within the network. A transmission delay time to be compensated for by the memory 14 is set to be larger than a 99% delay within the network, and the memory 14 has a capacity that allows the compensation of, for example, usually N times the blocking time. Thus the storage of N blocks is allowed. A packet disassembler 12 judges whether or not a packet received from the data bus BUS4 is destined for its own address and if so, deletes the header H from the received packet and then writes it in the memory 14. A controller 13, when the memory 14 stores the N blocks therein, outputs a decoding command signal 19 to a decoder 15 to start the decoding operation of the N blocks. When the packet disassembler 12 does not receive a packet from the data bus BUS4, the controller 13, after the contents of the memory 14 have been fully decoded, controls the switch 17 so that a low level of white noise is sent from a white noise generator 16 to an analog interface 6B.

Referring to FIG. 5, there is shown a timing chart for explaining the operation of the voice packet terminal of FIG. 4. In FIG. 5, (A) shows the time series of blocks corresponding to voice-presence parts in an input voice signal, and (B) is a chart showing the voice-presence detection timing of the voice/silence detector 9. The reason why it is impossible to detect the presence of a block voice in the input voice signal (A) in synchronism with the beginning one of blocks "1" to "13" in the block voice is that, as shown by voiceless consonant signal waveforms in FIG. 6, (A) to (C) and by voiced consonant signal waveforms in FIG. 6 (D) to (E), the head part of a voice at the beginning of an utterance is small in amplitude so that it is technically difficult to judge such a very weak signal as the presence of a voice. Also, from the viewpoint of enhancing noise-resisting properties, it is not preferable to regard such a very weak signal as the presence of a voice. Accordingly, voice detection timing takes place as delayed by a specific time, which is 40 ms or more with respect to the actual voice starting time point. In order to prevent voice head part truncation, occurs when there is a missing head part of the voice signal caused by a failure of the transmission of the beginning part of the voice signal due to a timing lag in voice detection, a predetermined number of blocks prior to voice detection are regarded as the voice presence blocks. These blocks are attached to the voice block after voice detection and are then transmitted, as shown in FIG. 5, waveform (C). The waveform (C) of FIG. 5 has the time scale illustrated because the multiplex line 1 has a high bit rate. Since voice data converted into packets within the network is transmitted on a packet basis in an order such that the packets are converted from the voice data, buffer queue lengths different at various points in the network. Voice data changing momentarily will cause, on the signal reception side, the fluctuation of the transmission delay shown in FIG. 5, waveform (D). When the voice signal (D) is decoded without being subjected to any compensation for such fluctuation, underrun or overrun phenomenon occurs in the voice signal as shown by marks * in FIG. 5, waveform (E). This is undesirable from the viewpoint of a natural listening sense. For the purpose of absorbing such fluctuation, it is common practice to employ a method for storing N blocks of a voice signal in the memory 14 and then decoding them as shown by a decoded voice signal in FIG. 5, waveform (F). In this Figure in which reference symbol t1 denotes a delay time (N×a block time) for fluctuation absorption and t2 denotes a total delay time from a voice absence state to a voice presence state. The time t2 is expressed by the following equation.

$$t2 = T\alpha + T\beta + t1$$

where, $T\alpha$ represents lag time in the voice detection, and $T\beta$ represents a signal transmission delay within the network.

As has been explained in the foregoing, in the prior art voice data transmission system, a voice signal is subjected, on the signal transmission side, to a detection of its voice-part and then to an attachment of a predetermined number of blocks to the voice detection block to be transmitted. The voice signal is further subjected, on the signal reception side, to an insertion of the fluctuation absorbing delay time t1 for compensation for fluctuation at signal reception time, which causes the total delay time t2 to become large. Further, since a header H, or the like, is attached to a packet, the length of one packet cannot be made too short from the viewpoint of transmission efficiency. Thus, the block time is greatly affected by the delay time t1 because fluctuation absorption cannot be made small, correspondingly. As a result, the prior art system has a problem in that conversation becomes unnatural and an echo controller must be provided for removing any echo.

SUMMARY OF THE INVENTION

It is an object of the present invention to provide a voice data transmission system and method which can reduce the transmission delay time and can remove any unnatural conversation of a received voice due to the truncation of the head part of the voice.

Another object of the present invention is to provide a voice data transmission system and method, in which a signal reception side can reproduce and output the first part, the voice-presence state of a conversation following a long voice-absence state, with good quality.

In accordance with one aspect of the present invention, the signal transmission side of the voice data transmission system, when a voice detection signal is generated, continuously transmits, at a transmission rate faster than a usual transmission rate, a first voice data block at the time of generation of the voice detection signal. Voice data blocks which are followed by the first voice data block and which correspond to a time duration from the generation time of the voice detection signal back to a predetermined time are also transmitted in a voice detection mode, the present invention subjects voice data to a blocking operation and after its completion, and then transmits it.

As a result, the signal reception side can generate a decoding command signal without waiting for the storage of a plurality of voice data, whereby the fluctuation absorbing delay time t1 can be made to equal substantially zero and the total delay time can be reduced.

In accordance with another aspect of the present invention, the signal transmission side transmits, to the signal reception side, a voice packet signal attached in its head part with packets corresponding to packets which belong to the head part and which were regarded as nonvoices by a voice/silence detector. The signal reception side, when receiving a voice packet signal followed by the continuation of a predetermined time of silence (voice absence state), estimates a fluctuation absorbing delay time for the voice packet signal on the basis of transmission delay times between packets corresponding to its head part, attaches packets, corresponding in number to the estimated fluctuation absorbing delay time, to the head part of the received voice packet signal, and reproduces the attached signal.

As a result, even when the load of a line, through which a voice packet signal is transmitted, is varied and the transmission delay time of the voice packet signal is correspondingly changed in a non-voice mode, the present invention can properly cope with it.

BRIEF DESCRIPTION OF THE DRAWINGS

FIGS. 10A-10C and 11A-11C are timing charts for explaining the operation of the embodiment of FIG. 9.

DESCRIPTION OF THE PREFERRED EMBODIMENTS

Figure 1:
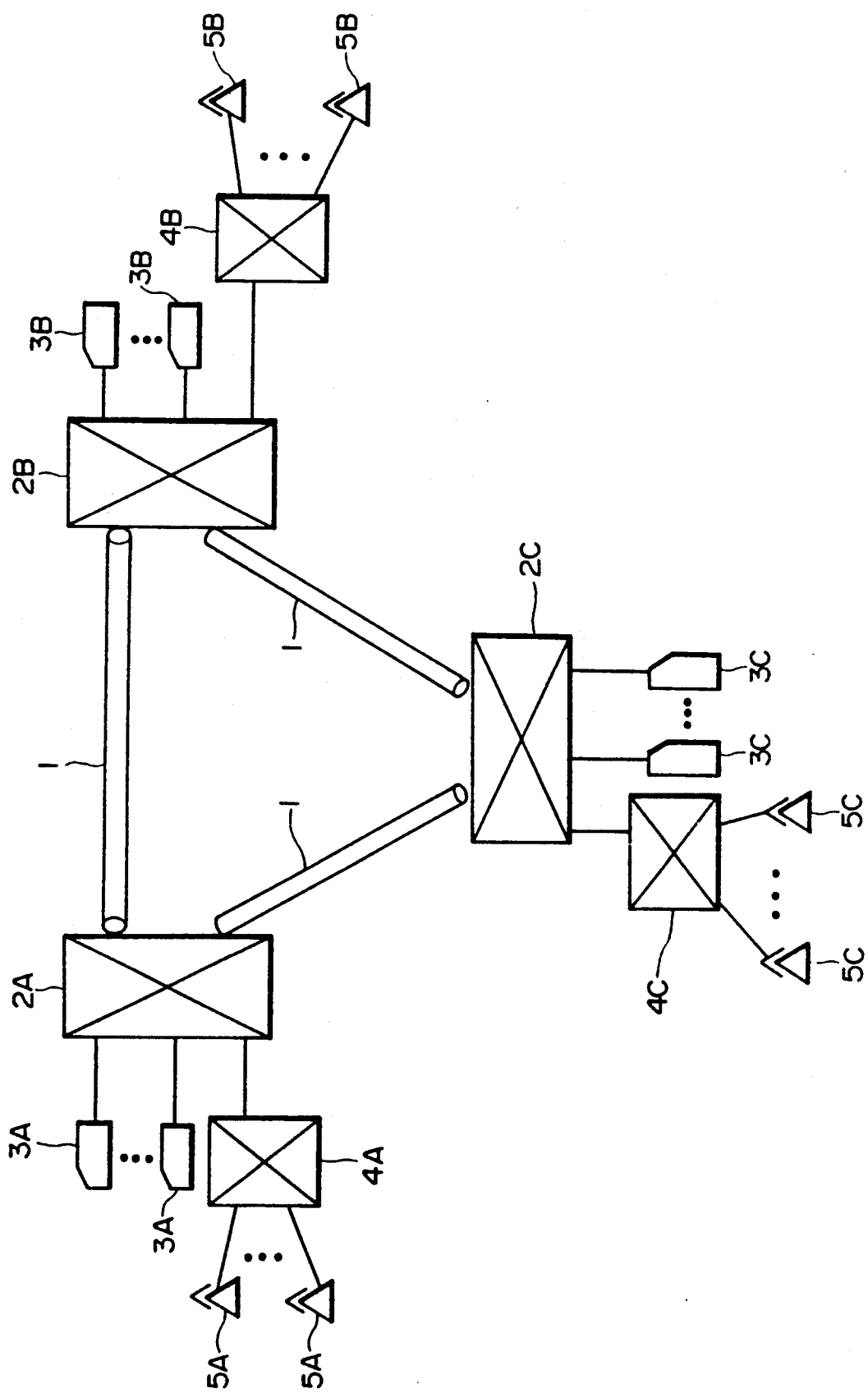
FIG. 1 is a general arrangement of a network through which voice data are transmitted.
Figure 2:
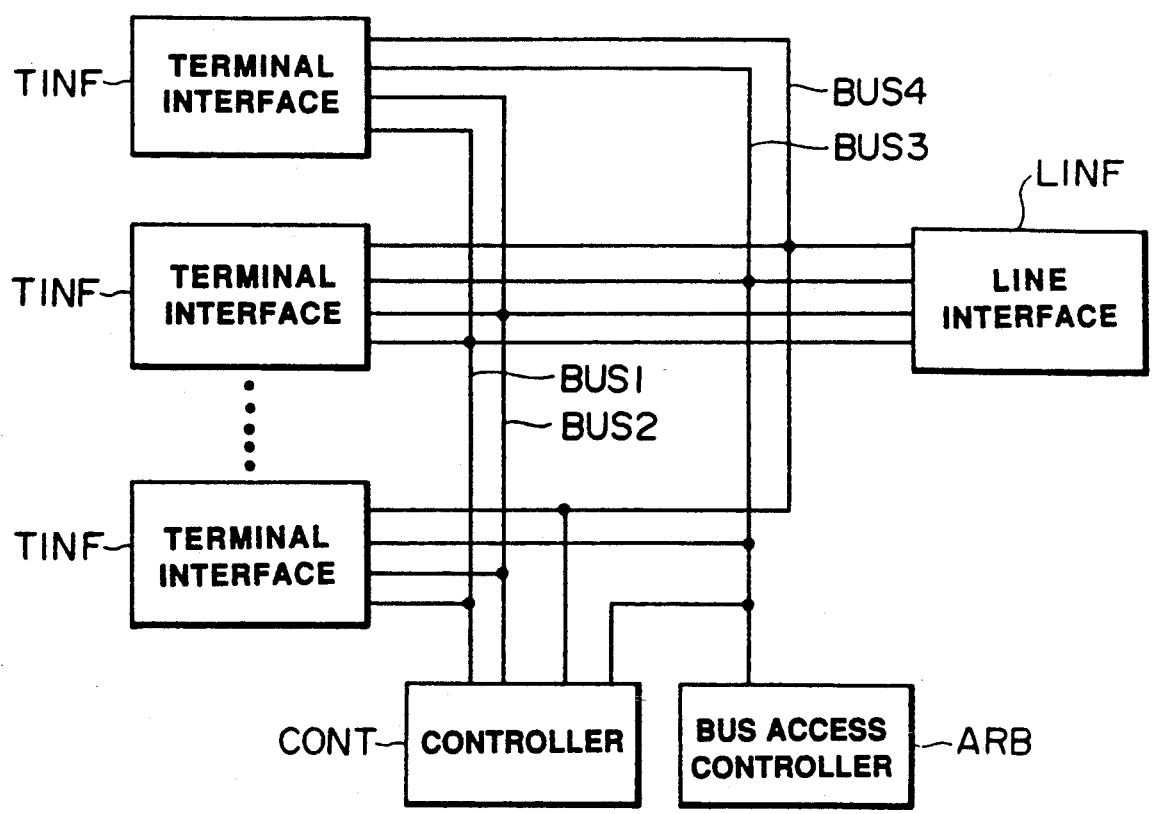
FIG. 2 is an arrangement of a packet exchange.
Figure 3:
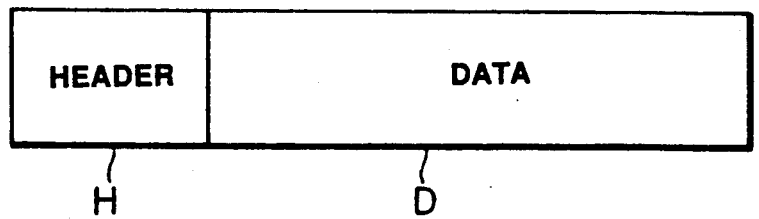
FIG. 3 shows a configuration of a packet.
Figure 4:
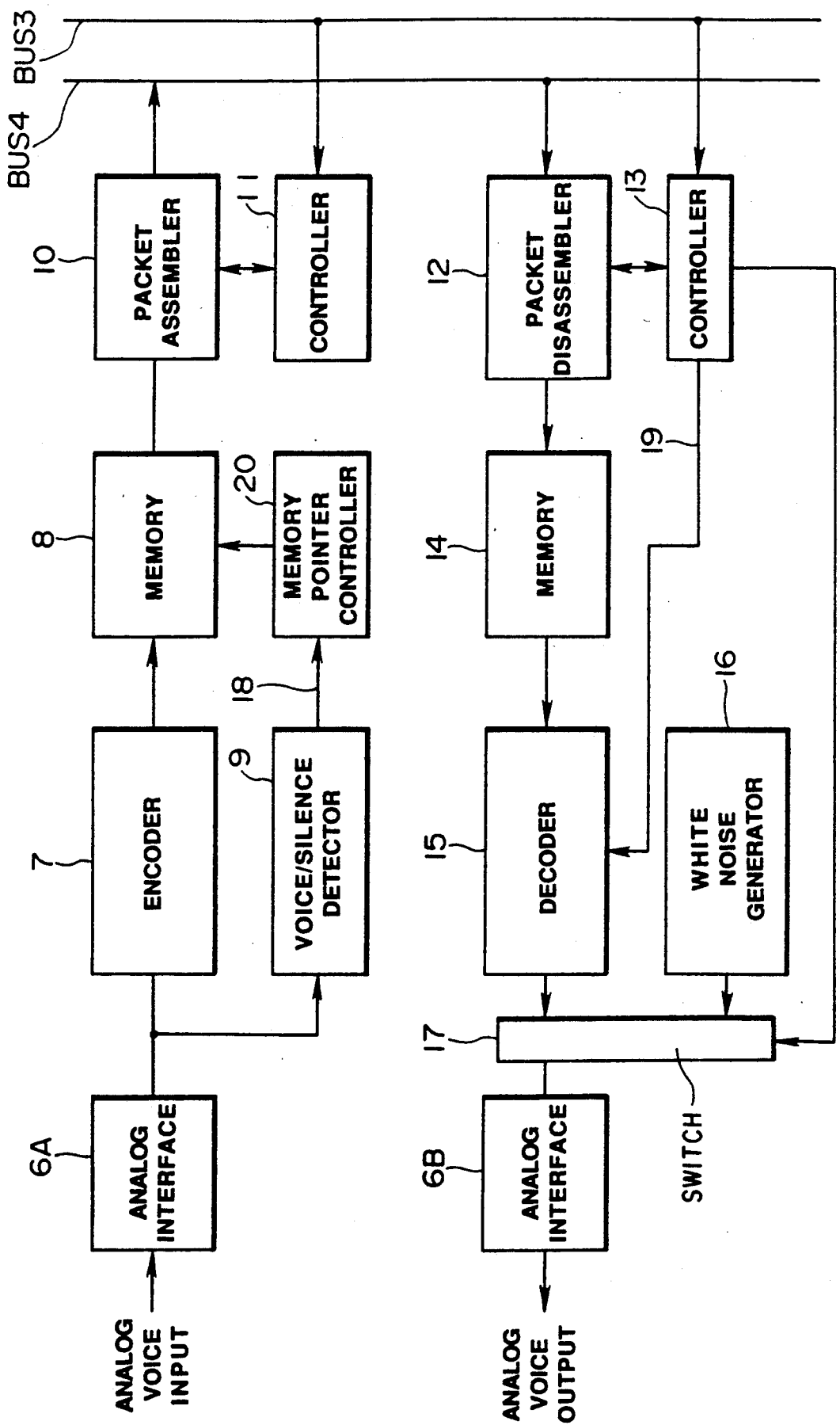
FIG. 4 is a prior art arrangement of a voice terminal interface.
Figure 5:
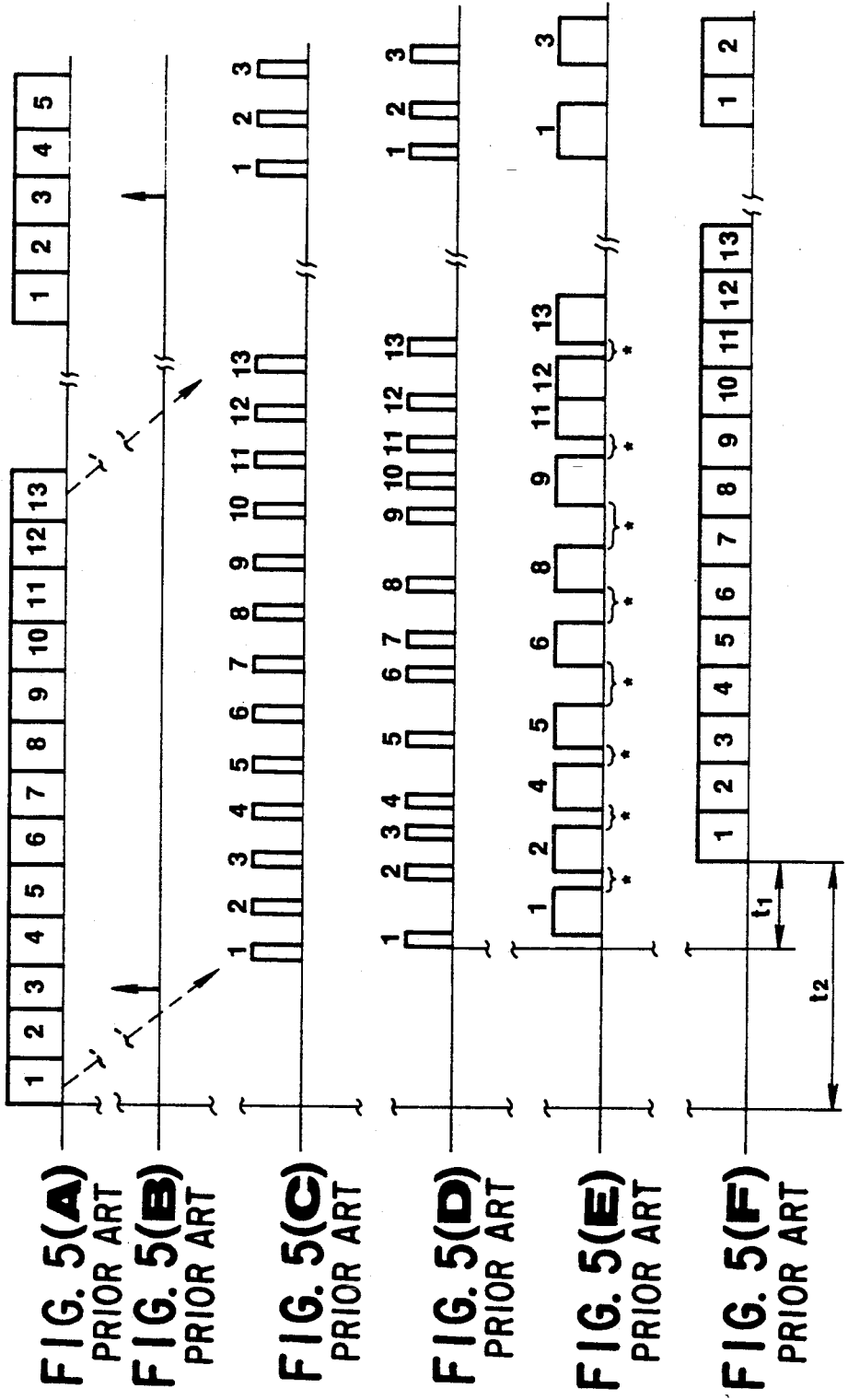
FIGS. 5A-5F are timing charts for explaining the operation of FIG. 4.
Figure 6:
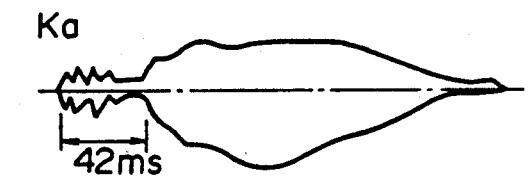
FIGS. 6A-6F show exemplary waveforms of voice signals for explaining amplitude variations.
Figure 6:
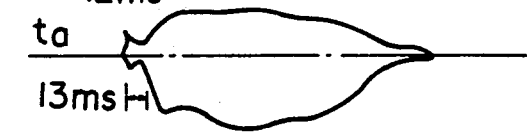
Figure 6:
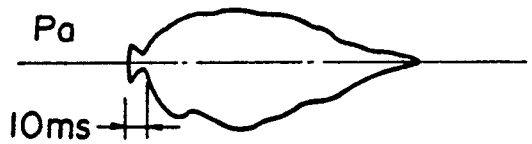
Figure 6:
Figure 6:
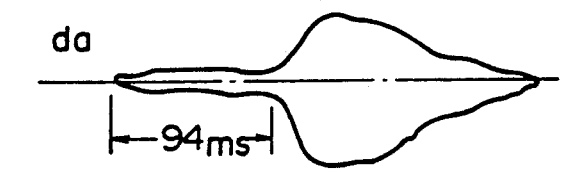
Figure 6:
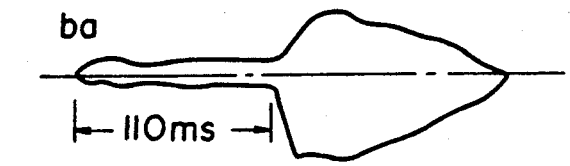
Figure 7:
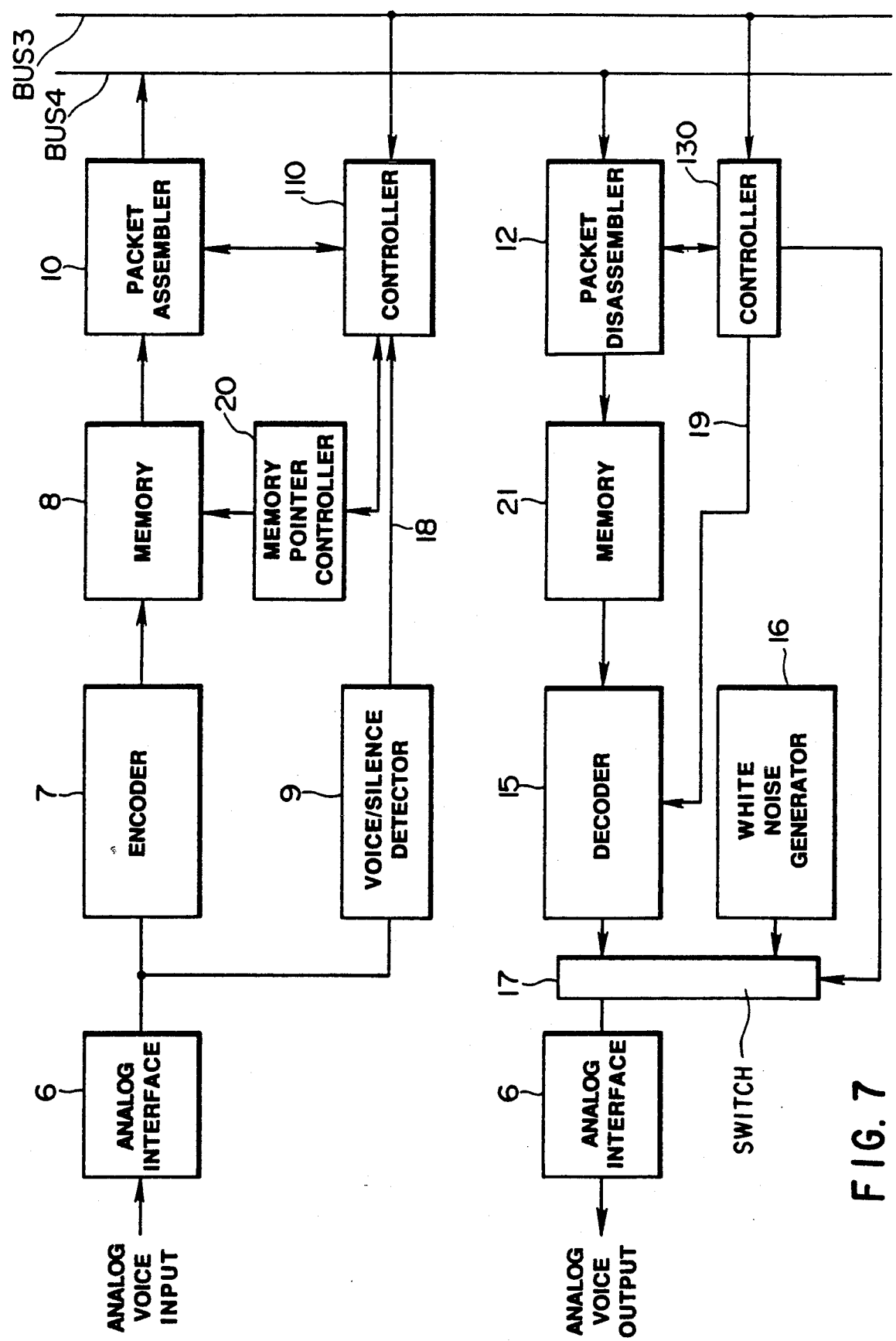
FIG. 7 is a block diagram of a voice terminal interface to which one embodiment of the present invention is applied.

Referring to FIG. 7, there is shown an embodiment of the present invention. FIG. 7 shows a block diagram of a voice terminal interface to which an embodiment of the present invention is applied, in which parts having the same functions as those in the voice terminal interface of FIG. 4 are denoted by the same reference numerals or symbols. Therefore, only parts different in function from those in the prior art will be explained. In FIG. 7, a controller 110, detects a change in the voice-presence detection state of the voice/silence detection signal 18 received from the voice/silence detector 9, accesses the memory pointer controller 20 and examines the current address at which a block Bi of an encoded voice data is currently being written in the memory 8. Thereafter, the controller 110 calculates a past address at which a past voice data is already written a predetermined time ago, for example, by subtracting a predetermined-time-past address from the current address at which the voice data block Bi is now being written. Under control of the controller 110, the packet assembler 10 starts the reading operation from a voice data block Bj which is already written at the past address the predetermined time ago. The pocket assembler 10 prepares a packet attached with the voice data blocks Bj to Bi, and continuously transmits the packet on a burst basis utilizing capability of the wide band transmission of the multiplex line 1. In timing charts (A), (B), and (C) of FIG. 8, (A) shows the time series of an input voice signal, (B) shows voice presence detection timing by the voice/silence detector 9, and (C) shows time series of blocks to be transmitted. More specifically, in FIG. 8, waveform (C) shows an example in which transmission is started from a block located two blocks away with respect to the voice-pressence detection timing.

Figure 8:
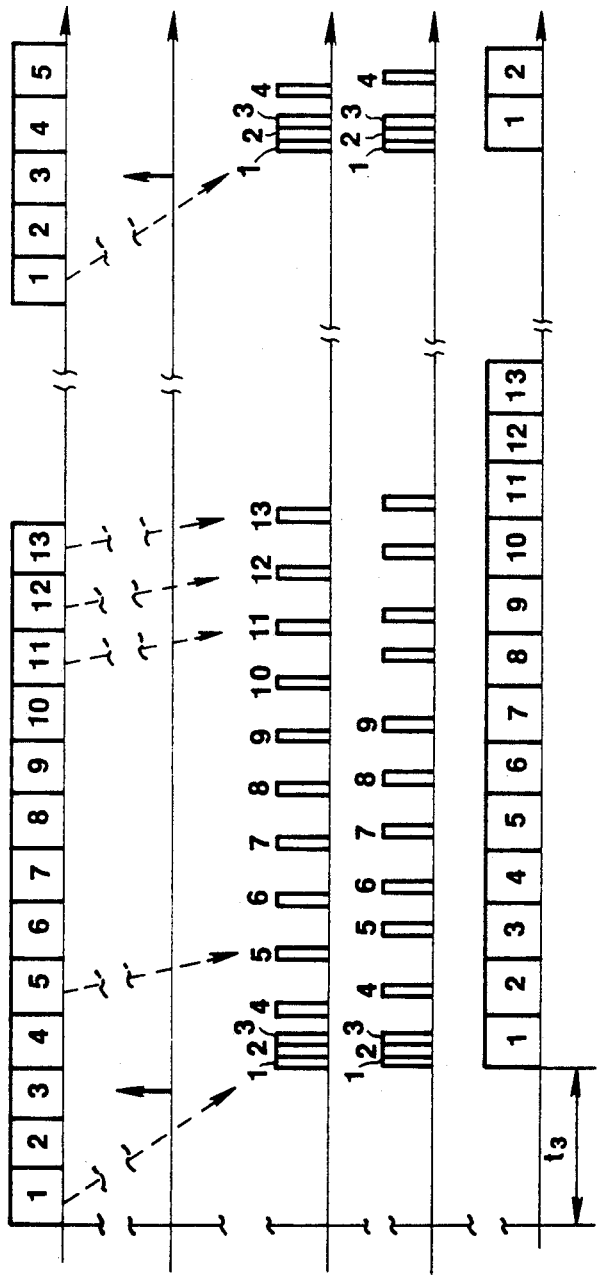
FIGS. 8A-8E are timing charts for explaining the operation of FIG. 7.

Explanation will next be made of the signal reception side of the voice terminal interface of FIG. 7. The packet disassembler 12 receives a packet from the data bus BUS4 and, if the received packet is destined for its own address, removes the header H from the packet, writes it in the memory 21 and informs the controller 13 of reception of the packet. Since the voice head part packets are continuously transmitted on a burst basis, when it is taken into consideration that the decoding time of the voice blocks in the head part is generally smaller than the dispersion time in the arrival of the received packets, the controller 130 can immediately output the decoding command signal 19 to the decoder 15 simultaneously with the writing of the data blocks in the memory 21, without causing any fluctuation delay. FIG. 8, (D) shows a time series of blocks in a received voice signal having fluctuations, while FIG. 8, (E) shows a decoded voice signal with fluctuations absorbed.

As shown in FIG. 8, (E), in accordance with the present embodiment, the delay time for fluctuation absorption is almost removed so that the total delay time (corresponding to t3 in FIG. 8) can be shortened, whereby unnatural conversation can be improved and the need for preparation of an echo controller or the like can be eliminated.

Figure 9:
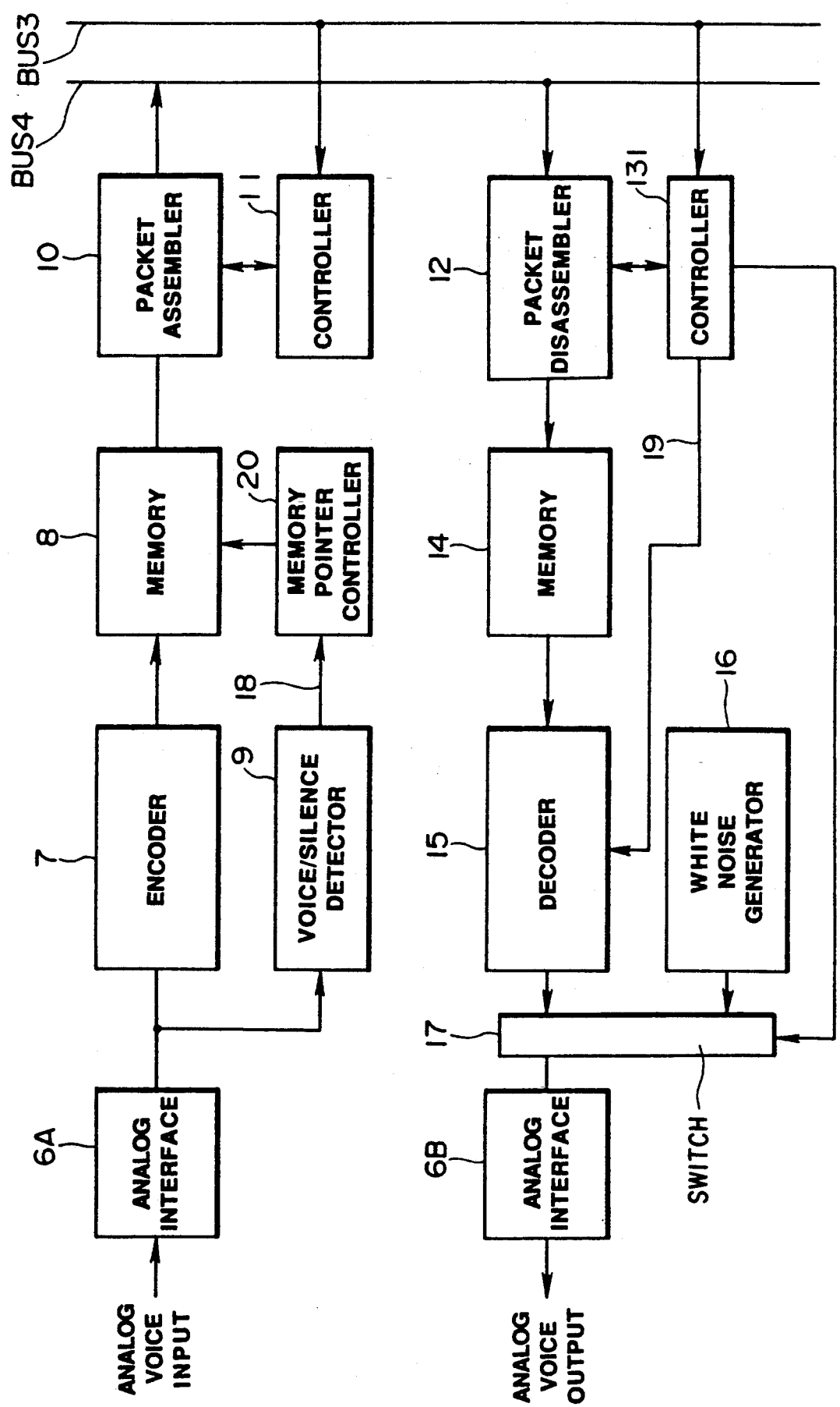
FIG. 9 is a block diagram of a voice terminal interface to which another embodiment of the present invention is applied.

FIG. 9 shows a voice terminal interface to which another embodiment of the present invention is applied, wherein parts having substantially the same functions as those in the prior art of FIG. 4 are denoted by the same reference numerals or symbols. In the present embodiment, the operation of its signal transmission side is the same as that of FIG. 4. That is, a plurality of voice packets are sequentially transmitted from the signal transmission side so that a plurality of packets corresponding to the head part of the voice packet signal are first transmitted, which is shown in FIG. 10, (A). In FIG. 10, packets corresponding to the head part of a voice signal which will be referred to as "head part packets", hereinafter, are denoted by "A", "B" and "C", whereas voice packets corresponding to the other voice part of the voice signal are denoted by "1", and "2", "3", etc.

On the signal reception side of the voice terminal interface of FIG. 9, the packet disassembler 12 receives a packet signal from the data bus BUS4 if the received packet signal is destined for its own address, deletes the head H from the received packet signal and writes it in the memory 14. At this stage, the received packet signal from the data bus BUS4 has the fluctuation delay shown in FIG. 10, (B). A controller 131 monitors the packet signal received at the packet disassembler 12 and estimates a fluctuation absorption delay time for absorbing the fluctuations on the basis of transmission delay times between the head part packets in the received signal. For example, when delay times $\alpha$ and $\beta$ occur between the head part packets "A", "B", and "C", the controller 131 estimates a packet transmission delay time between voice packets due to a line load on the basis of an average value $(\alpha+\beta)/2$, and deduces a fluctuation absorbing delay time for the voice packets from the estimated packet transmission delay time. The controller 131 sends the decoding command signal 19 to the decoder 15 to insert a head part restoration packet corresponding to the deduced fluctuation absorbing time in the received signal. As shown in FIG. 10, a head part packet "C" is inserted immediately in front of the voice packet "1" to be used as a decoded output, as shown in (C). This enables the absorption of the fluctuation delays between the voice packets and thus the prevention of a head-part truncated voice signal.

Although only the head part packet "C" has been inserted in front of the voice packet in FIG. 10, the head part packets "B" and "C" may be inserted as shown in FIG. 11 or all the head part packets "A", "B", and "C" may be inserted, depending on the values of the delay times $\alpha$ and $\beta$ between the head part packets "A", "B", and "C". In the present embodiment, for example, in the case where Td<tb (Td and tb being a deduced fluctuation absorbing delay time and a reproduction time corresponding to one block respectively), one head part packet "C" is inserted; in the case where tb<Td<2tb, two head part packets "B" and "C" are inserted; and in the case where 2tb<Td, three head part packets "A", "B", and "C" are inserted.

The understandability of conversation is, generally speaking, determined not by the clearness of words in the conversation but by the natural flow of the conversation. However, at the beginning of a conversation or when the conversation is not continued for a constant time and then conversation is restarted, the understandability of the first word in the conversation is greatly affected by the clearness of the word. For this reason, with respect to the beginning part of the conversation started after a predetermined time of silence, it is preferable from the viewpoint of natural listening to determine the fluctuation absorbing delay time on the basis of the packet transmission delay. In this case, the outlined above becomes effective.

In the case where the voice data transmission system receives the next voice packet prior to full passage of the predetermined time of silence, the system may be arranged so that a fluctuation absorbing delay time is set not on the basis of the head part packets but on the average delay time between when the previous voice packets and the corresponding head part packet or packets are inserted.

In this way, in accordance with the present embodiment, since the fluctuation absorbing delay time for voice packets is estimated on the basis of the delay times between the head part packets, even when a conversation is started or when a predetermined time of silence continues followed by a voice state, in the course of a conversation, a suitable fluctuation absorbing delay time can be set and the clearness of the first word in the conversation can be enhanced. In addition, since the head part packets are reproduced during the fluctuation absorbing delay time, voice head part truncation can be avoided and thus voice quality can be improved to a large extent.

What is claimed is:

1. A signal transmission side unit of a voice data transmission system, which divides a voice signal into a plurality of data blocks, prepares the data blocks into packet data and asynchronously transmits the packet data, and a signal reception side unit, which receives and reproduces the packet data transmitted from the signal transmission side unit, said signal transmission side unit comprising:

memory means for sequentially storing the data blocks;

voice/silence detecting means for detecting voice presence and absence parts in said voice signal; and transmission means for transmitting, on a burst basis, a predetermined number of data blocks stored in said memory means prior to detection by said voice/silence detecting means of a change in the voice signal from the voice absence part to the voice presence part.

2. The signal transmission side unit as set forth in claim 1, wherein said voice/silence detecting means detects a part of said voice signal as the voice presence part when said part of the voice signal exceeds a predetermined level.

3. The signal transmission side unit as set forth in claim 1, wherein said transmission means continuously transmits, in packet form, the predetermined number of data blocks stored in said memory means prior to detection of said change to the voice presence part.

4. The signal transmission side unit as set forth in claim 1, wherein when said transmission means completes the burst transmission of the predetermined number of data blocks stored in said memory means prior to detection of said change to the voice presence part, and the transmission means sequentially transmits subsequent data blocks when packeting of the data blocks is completed.

5. The signal transmission side unit as set forth in claim 1, wherein said transmission means prepares said data blocks into packet form with a header attached thereto and transmits said packet data.

6. A signal reception side unit of a voice data transmission system, the voice data transmission system including a signal transmission side unit, which divides a voice signal into a plurality of data blocks, prepares the data blocks into packet data with head parts, and asynchronously transmits the packet data, wherein the signal reception side unit receives and reproduces the packet data transmitted from the signal transmission side unit, said signal reception side unit comprising:

means for monitoring received packet data and for estimating, when the signal reception side unit receives said packet data, a fluctuation absorbing delay time of said received packet data on the basis of relative transmission delay times between said head parts of said received packet data;

means for attaching to said received packet data, as said head parts, head part restoration packets corresponding in number to said estimated fluctuation absorbing delay time; and means for reproducing said head part restoration packets.

7. The signal reception side unit as set forth in claim 6, wherein said fluctuation absorbing delay time estimating means estimates said fluctuation absorbing delay time on the basis of an average value of said relative transmission delay times among the plurality of packet data corresponding to said head parts.

8. A method of transmitting voice data in which a voice signal is divided into a plurality of data blocks, the data blocks being prepared into packet data and the packet data being asynchronously transmitted, said method comprising the steps of:

sequentially storing said data blocks;

detecting a change in the voice signal from a voice absence part to a voice presence part; and transmitting in packet form, when said change from the voice absence part to the voice presence part is detected in the detecting step, on a burst basis, a predetermined number of data blocks stored in the storing step prior to detection of said change, at a transmission rate faster than a usual transmission rate.

9. The voice data transmitting method as set forth in claim 8, wherein said storing step includes the substeps of encoding said data blocks and sequentially storing the encoded data blocks.

10. The voice data transmitting method as set forth in claim 8, wherein said detecting step is performed by detecting the change in the voice signal from the voice absence part to the voice presence part when said voice signal exceeds a predetermined level.

11. The voice data transmitting method as set forth in claim 8, wherein said transmitting step is carried out by continuously transmitting, in the packet form, the predetermined number of data blocks stored in the storing step prior to detection of a change in the voice presence part.

12. The voice data transmitting method as set forth in claim 8, wherein said transmitting step is performed, when the burst transmission of the predetermined number of data blocks stored in the storing step prior to detection of change in the voice presence part is completed, by sequentially transmitting subsequent data blocks each time the packeting operation on the data blocks is completed.

13. A method of transmitting voice data in which a voice signal is divided into a plurality of data blocks, the data blocks are prepared into packet data and the packet data is asynchronously transmitted from a signal transmission side unit to a signal reception side unit, which reproduces the received packet data, said method comprising the steps of:

monitoring the received packet data and estimating, when the signal reception side unit receives said received packet data, a fluctuation absorbing delay time of said received packet data on the basis of relative transmission delay times among a plurality of received packet data corresponding to a head part of said received packet data;

attaching, as said head part, packets corresponding in number to said fluctuation absorbing delay time estimated in said estimating step to packet data corresponding to said voice presence part, excluding said head part; and reproducing said attached packets.

14. The voice data transmitting method as set forth in claim 13, wherein said estimating step is carried out by estimating said fluctuation absorbing delay time on the basis of an average value of the relative transmission delay times among said plurality of received packet data corresponding to said head part.

* * * * *